US012599543B2

(12) United States Patent
Fife

(10) Patent No.: US 12,599,543 B2
(45) Date of Patent: Apr. 14, 2026

(54) ALL-IN-ONE INSULATED BABY BOTTLE

(71) Applicant: Peter Fife, Provo, UT (US)

(72) Inventor: Peter Fife, Provo, UT (US)

( * ) Notice: Subject to any disclaimer, the term of this patent is extended or adjusted under 35 U.S.C. 154(b) by 0 days.

(21) Appl. No.: 18/652,800

(22) Filed: May 1, 2024

(65) Prior Publication Data

US 2025/0064683 A1 Feb. 27, 2025

Related U.S. Application Data

(60) Provisional application No. 63/534,057, filed on Aug. 22, 2023.

(51) Int. Cl.
*A61J 9/00* (2006.01)
*A61J 11/04* (2006.01)

(52) U.S. Cl.
CPC ............... *A61J 9/008* (2013.01); *A61J 11/04* (2013.01)

(58) Field of Classification Search
CPC .................................. A61J 9/008; A61J 11/04
USPC ......................................................... 215/11.6
See application file for complete search history.

(56) References Cited

U.S. PATENT DOCUMENTS 5,762,120 A * 6/1998 Smith ..................... B67C 11/02 141/331
5,975,337 A 11/1999 Hadley
9,050,242 B1 * 6/2015 Mooney .................... A61J 9/08
2006/0157463 A1 * 7/2006 Wiele ...................... A47J 31/40 219/214
2009/0120891 A1 5/2009 Rahman
2010/0213156 A1 * 8/2010 Belnap ...................... A61J 9/00 215/11.1
2011/0006028 A1 1/2011 Caldwell
2013/0277327 A1 10/2013 Fong
2014/0260117 A1 * 9/2014 Farber ....................... A61J 9/00 215/11.4
2015/0122765 A1 5/2015 Cannon
2015/0272360 A1 10/2015 Knowlton
2018/0009590 A1 1/2018 Wong
2018/0318176 A1 11/2018 Hayes
2021/0068520 A1 * 3/2021 Chung ............... A47G 19/2272
2023/0053378 A1 * 2/2023 Myers .................. A61M 1/062
2023/0271766 A1 8/2023 Antico

FOREIGN PATENT DOCUMENTS

JP 2006290461 A * 10/2006

OTHER PUBLICATIONS https://www.youtube.com/watch?v=2rrzh7Eof30 by PopYum (Year: 2018).*

* cited by examiner

*Primary Examiner* — Don M Anderson
*Assistant Examiner* — Jessica Kavini Tamil

(57) ABSTRACT

An insulated baby bottle having an insulated storage container with a first pair of walls that are vacuum-sealed, a lid with a second pair of walls that are vacuum-sealed, where the lid is removably attached to the insulated storage container. The insulated baby bottle also has a nipple composed of a flexible material that has a first opening configured to receive liquid from the insulated storage container and a second opening configured to release liquid received from the insulated storage container, where the nipple is removably connectable to the insulated storage container with a liquid tight seal.

20 Claims, 5 Drawing Sheets

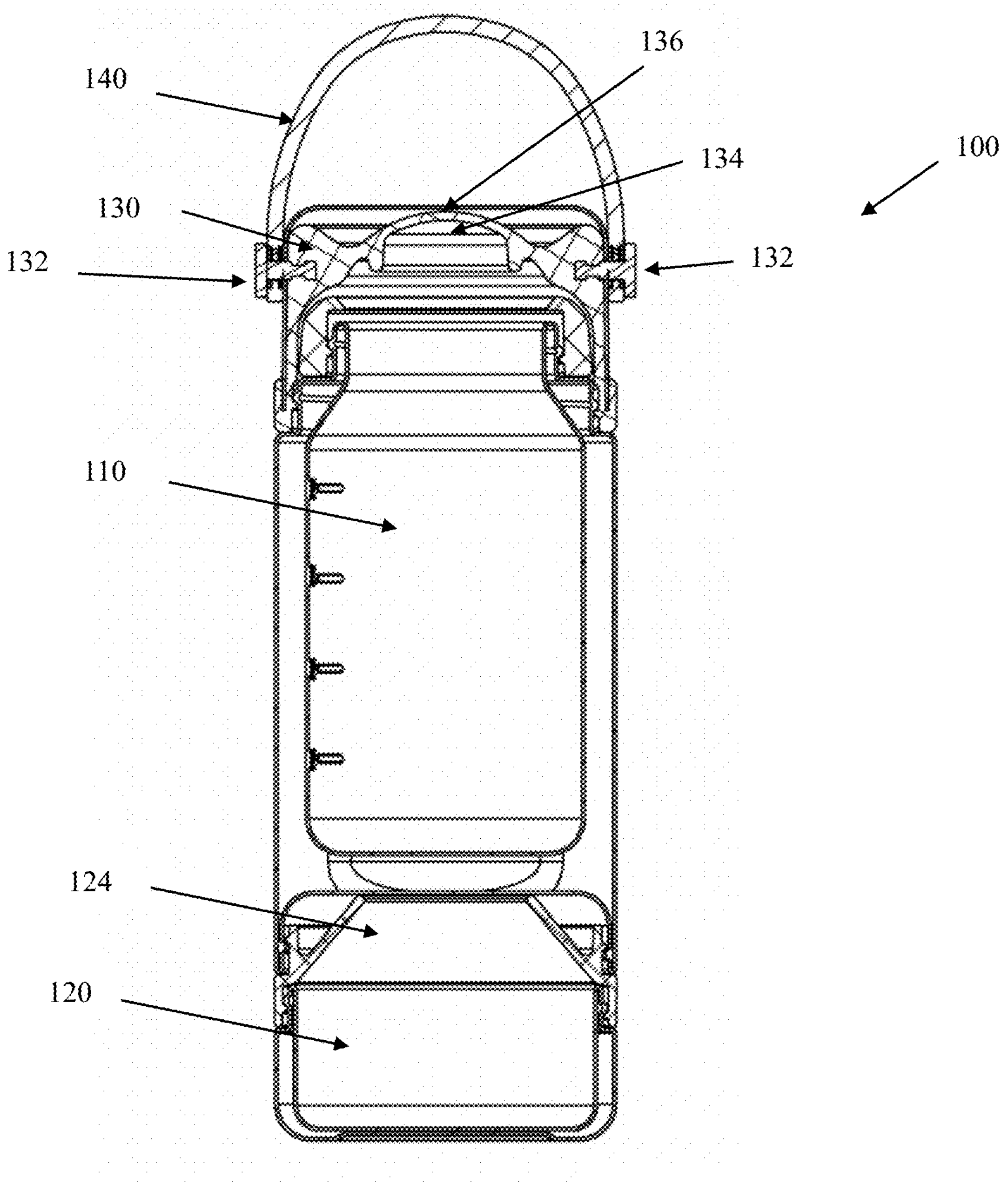
*FIG.* 1

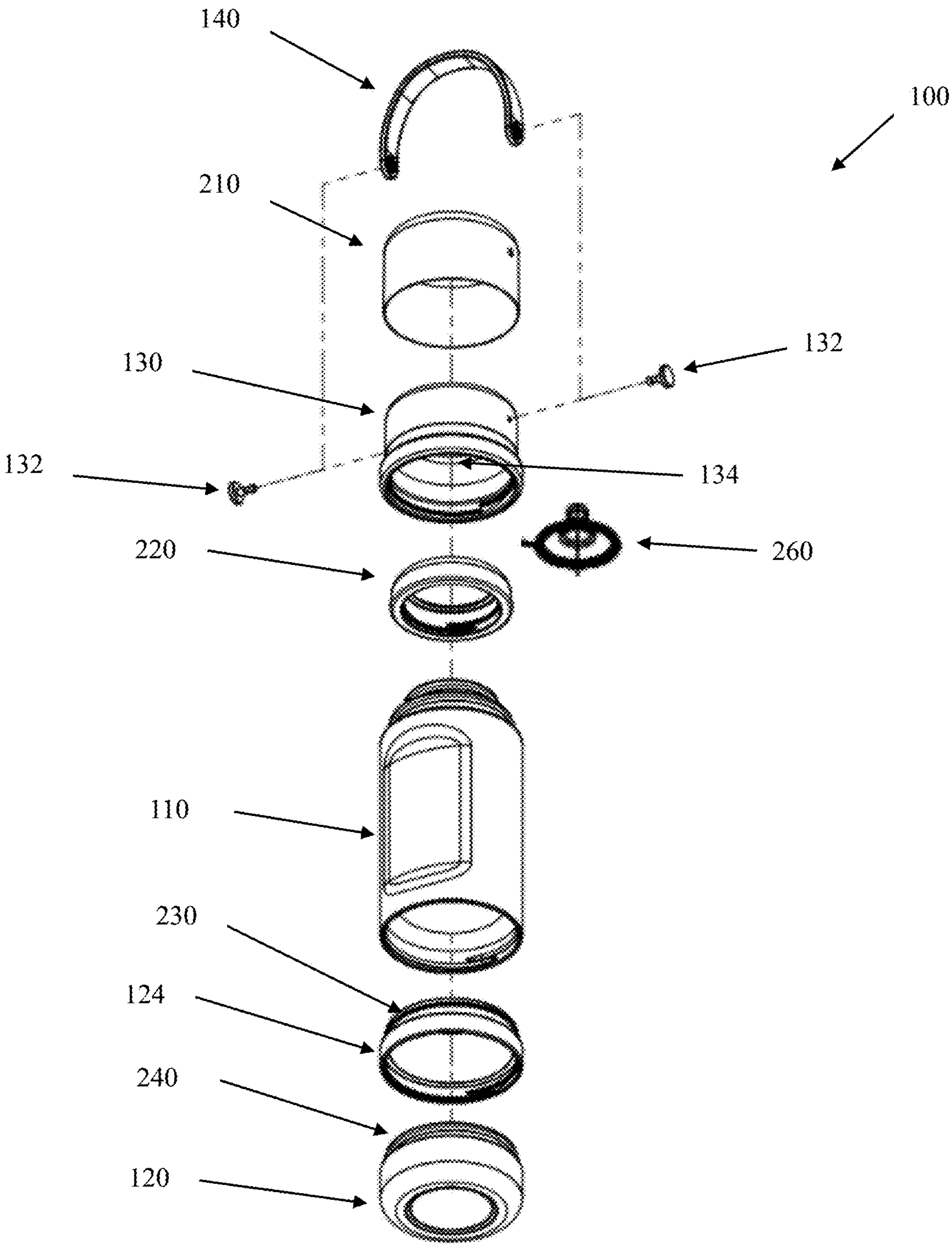
*FIG.* 2B

ALL-IN-ONE INSULATED BABY BOTTLE

RELATED APPLICATIONS

This application claims the benefit of U.S. Provisional Patent Application No. 63/534,057, filed Aug. 22, 2023, the entirety of which is incorporated herein by this reference.

BACKGROUND

A baby bottle is used for feeding babies. A baby bottle typically includes a compartment within a body in which to store a fluid and a nipple from which to deliver the fluid.

BRIEF DESCRIPTION OF THE DRAWINGS

In order to describe the manner in which the above-recited and other advantages and features of the present disclosure can be obtained, a more particular description of the present disclosure briefly described above will be rendered by reference to specific embodiments thereof which are illustrated in the appended drawings. Understanding that these drawings depict only typical embodiments of the present disclosure and are not therefore to be considered to be limiting of its scope, the present disclosure will be described and explained with additional specificity and detail through the use of the accompanying drawings.

FIG. 1 is a front, cross-sectional view of an all-in-one insulated baby bottle, according to some embodiments.

FIG. 2B is an exploded, low-angle view of an all-in-one insulated baby bottle, similar to FIG. 2A.

DETAILED DESCRIPTION

Figure 2A:
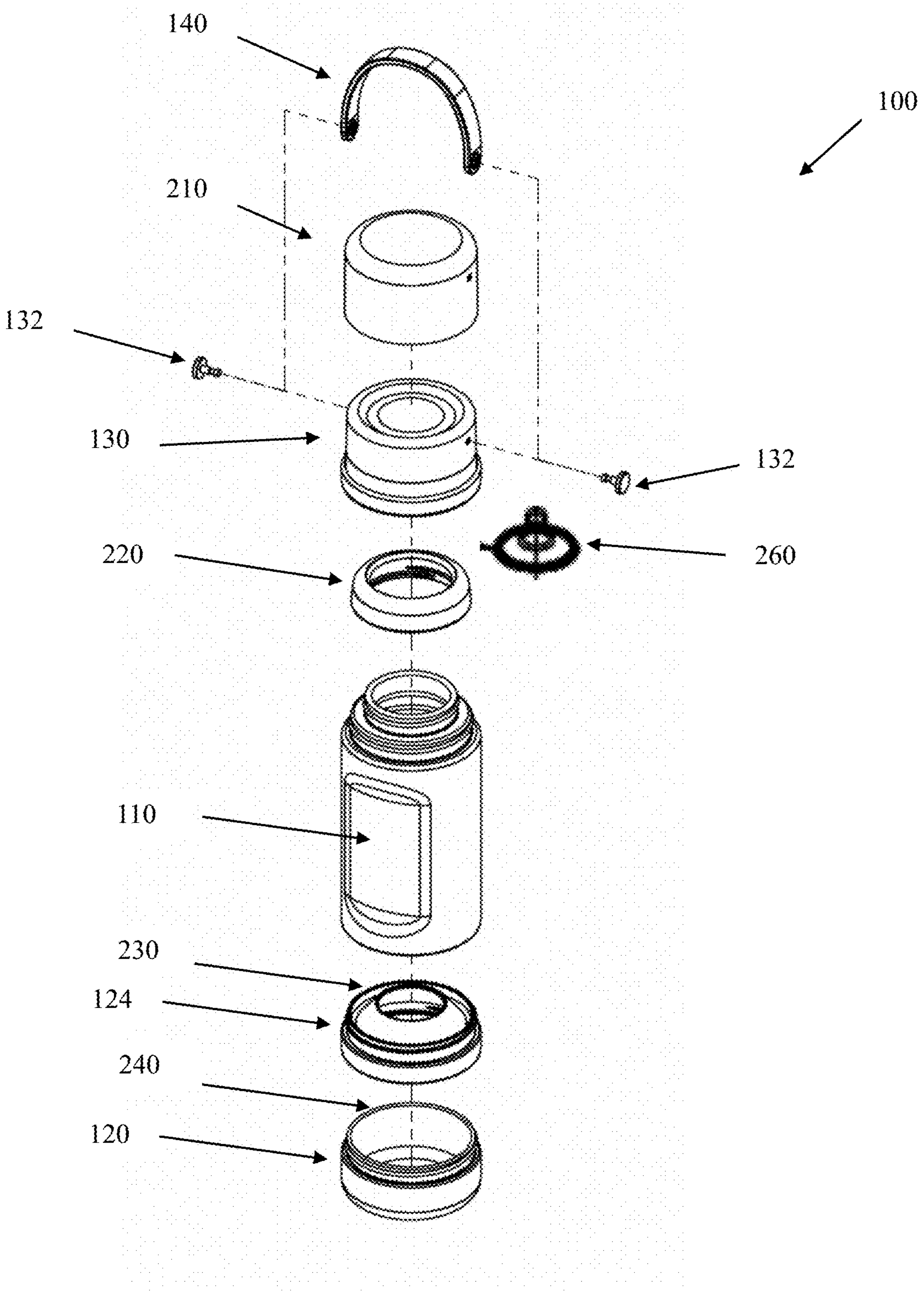
FIG. 2A is an exploded view of an all-in-one insulated baby bottle, according to some embodiments.

The present disclosure relates to an all-in-one baby bottle. In some embodiments, an apparatus and methods of the present disclosure provide a baby bottle that uses vacuum-sealed dual walls to insulate the baby bottle as well as provides for an attachable formula container to simplify traveling with a baby.

A baby bottle is used to feed liquids to a baby via a nipple connected to the container holding the liquid. For example, a container for the liquid may have threads on its neck that correspond with threads on the nipple base to attach the nipple to the container and allow a baby to suck from the nipple to drink the liquid inside the container. A baby bottle also serves the purpose of storing the liquid to be fed to the baby for a period of time.

Existing baby bottles may require many accessories when the user is traveling. These accessories include a separate container for baby formula powder, and a separate container to store heated water to combine with the powder. This may cause inconvenience to users while traveling and increases the likelihood of an accessory being forgotten and the baby not getting the proper nourishment. Existing baby bottles also do not provide proper temperature control because they use materials that do not provide insulation for the liquids inside the container.

The devices, components, systems, and methods of the present disclosure solve one or more of these shortcomings of conventional baby bottles. The present disclosure describes a baby bottle that provides all of these features. The present disclosure includes a baby bottle that is insulated and provides several features for a user to combine water and baby formula powder without needing additional accessories.

In some embodiments, the present disclosure is implemented as a baby bottle that includes an auxiliary storage container and an insulated storage container having a first pair of walls that are vacuum-sealed. In embodiments, a nipple is composed of a flexible material having a first opening configured to receive liquid from the insulated storage container and a second opening configured to release liquid received from the insulated storage container. In some embodiments, a lid may include a second pair of walls that are vacuum-sealed. The may also be uninsulated.

In various embodiments, the auxiliary storage container is a hollow, cup-shaped component that is attachable to the base of the insulated storage container and located below the insulated storage container. In some embodiments, the auxiliary storage container includes means for attaching to the insulated storage container. The insulated storage container may be a hollow component with walls made of two layers of material with the space between the layers of the walls being vacuum-sealed. The insulated storage container may include a neck that removably connects to the nipple with a seal positioned between the neck and the nipple.

In some embodiments, the nipple is shaped to be larger at the base than at the top with a hole in the top large enough to allow liquid through. The nipple may be formed of a flexible material and have a first opening configured to receive liquid, such as from the insulated storage container, and a second opening at a tip of the nipple configured to release liquid received into the nipple, such as from the insulated storage container. The nipple may be removably connectable to the insulated storage container with a liquid tight seal.

In various embodiments, the lid 130 is a hollow component having walls made of two layers of material with the space between the layers of the walls being vacuum-sealed. The lid may also be made of a single-walled plastic with no insulation or vacuum-sealed layers. In some embodiments, the lid is removably connected with the insulated storage container and, when connected to the insulated storage container, forms a complete enclosure for the nipple, creating a sealed environment between the lid and the insulated storage container.

The baby bottle of the present disclosure has technical advantages over conventional baby bottles. In some embodiments, the disclosed baby bottle maintains the temperature of liquids better than a conventional system. This allows the disclosed baby bottle to keep liquids at an optimum temperature for a longer amount of time. The baby bottle of the present disclosure may have more storage capacity than conventional solutions, which may allow the disclosed baby bottle to be more convenient for users who use formula and travel than conventional baby bottles.

FIG. 1 is a front, cross-sectional view of an all-in-one, insulated baby bottle 100, according to some embodiments. In some embodiments, the insulated baby bottle 100 includes, but is not limited to an insulated storage container 110 including a first pair of walls that are vacuum-sealed, an auxiliary storage container 120, a funnel 124, and a lid 130 including a second pair of walls that are vacuum-sealed. The lid 130 is removably attached to the insulated storage container 110. The bottle 100 may also have a handle 140 at a distal end at the top of the bottle 100. In some embodiments the auxiliary storage container 120 is removably connected to the funnel 124 and the funnel 124 is removably connected to the insulated storage container 110, all via threading. This allows the user to pour contents from the auxiliary storage container 120 through the funnel 124 and into the insulated storage container 110 with less spilling. The insulated storage container 110 can be removably connectable to the auxiliary storage container 120 via a set of mating threads.

In some embodiments, the lid 130 includes a handle 140. The handle 140 may be connected to the lid 130 via at least two protrusions or pins 132 positioned in apposition from each other on the lid 130.

In at least one embodiment, the lid 130 is a hollow component with walls made of two layers of material with a space between the layers of the walls being vacuum-sealed. Another variation of the lid includes a solid plastic piece, comprising a single wall with no vacuum-sealed walls. In some embodiments, all components are made of materials that are Bisphenol-A free. The lid 130 may also form an area configured to receive the tip of a feeding nipple 260, and may also be referred to as a nipple catch 134. In an assembled configuration, as shown in FIG. 1, the nipple catch 134 sufficiently encompasses the nipple such that the leakage of any fluid from within the insulated storage container 110 is hindered or prevented.

FIG. 2A is an exploded high-angle view of an all-in-one insulated baby bottle 100, according to some embodiments. FIG. 2B is an exploded, low-angle view of an all-in-one insulated baby bottle 100, similar to the view illustrated in FIG. 2A. In some embodiments, the lid 130 forms a complete enclosure for the nipple 260, referred to as a nipple catch 134. The nipple catch 134 is formed on the underside of the top of lid 130 such that the nipple 260 is received therein. The lid 130 forms the nipple catch 134 wherein the nipple catch 134 is configured to receive the tip of the nipple 260 such that leakage of fluid from the insulated storage container is prevented or hindered. The low angle view of FIG. 2B allows the threading to be seen on lid 130, nipple fastener 220, the top and bottom ends of insulated storage container 110, funnel 124, and auxiliary storage container 120.

Figures 3A, 3B, 3C:
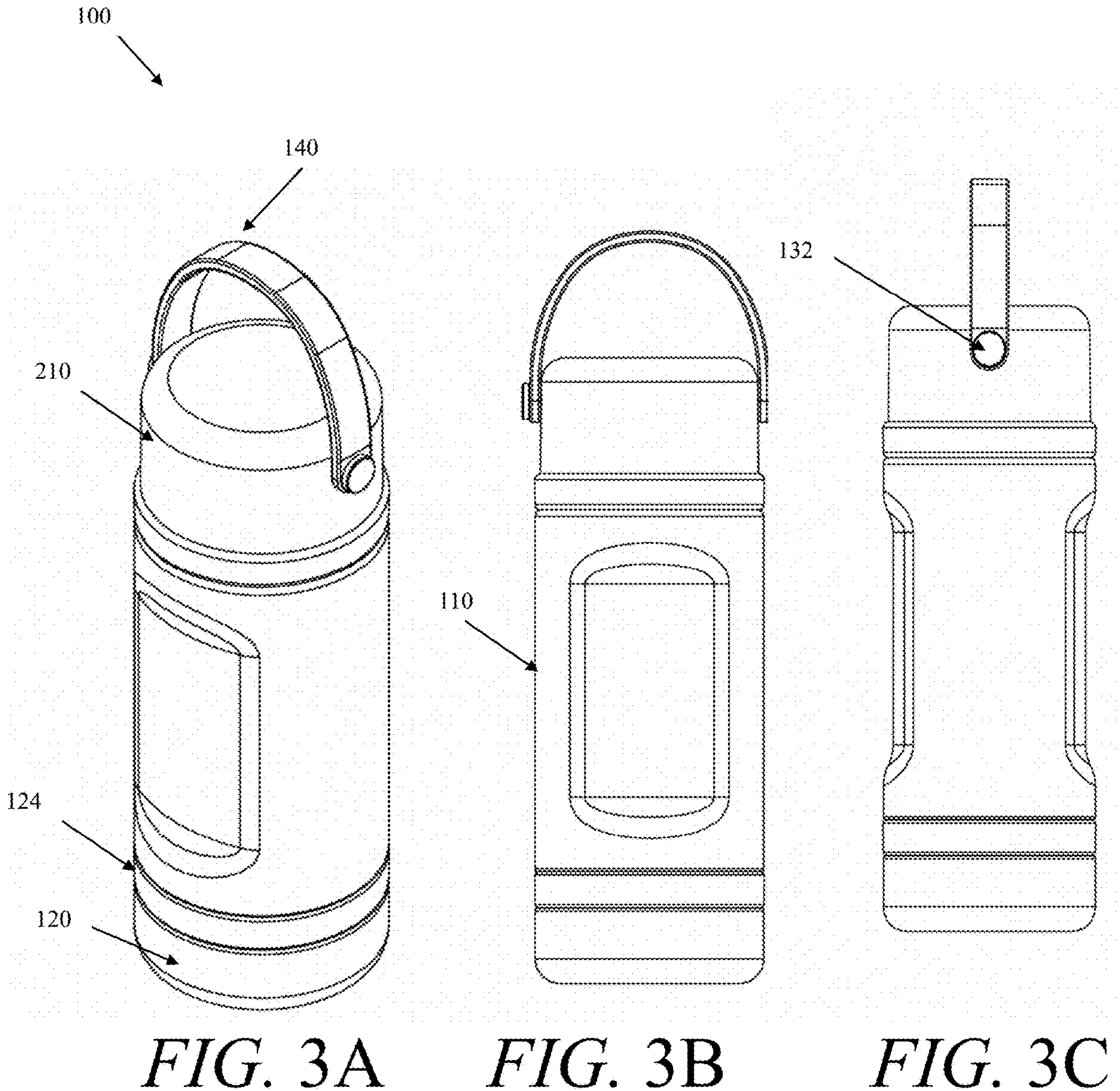
FIG. 3A, FIG. 3B, and FIG. 3C are perspective, front, and side views of an all-in-one insulated baby bottle, respectively.

FIG. 3A, FIG. 3B, and FIG. 3C are perspective, front, and side views of an all-in-one insulated baby bottle 100, respectively. In some embodiments, the all-in-one insulated baby bottle 100 includes an lid cover 210 that attaches to the lid 130 to make the shape of the insulated baby bottle more uniform. The lid cover 210 may be composed of stainless steel. In some embodiments, the lid 130 is removably connected to the insulated storage container 110 via threading. In some embodiments, when the lid 130 is connected to the insulated storage container 110, the lid 130 creates a complete enclosure for the nipple 260, referred to as a nipple catch 134 causing an air-tight seal between the lid 130 and the insulated storage container 110 (best seen in FIG. 1).

In some embodiments, a portion 136 of a wall of the lid 130 overlays the opening of the nipple 260, creating an air-tight seal when the lid 130 is attached to the insulated storage container 110 to prevent liquid from leaking out of the nipple 260 when the lid 130 is connected to the insulated storage container 110 (best seen in FIG. 1). In some embodiments, the nipple 260 is attached to the insulated storage container 110 using a nipple fastener 220, which has threads that correspond to threads on an upper end of the insulated storage container 110. In some embodiments, the nipple fastener 220 is a separate component that attaches the nipple 260 to the insulated storage container 110. In some embodiments, the nipple 260 functions as a gasket between the nipple fastener 220 and the insulated storage container 110, creating a liquid-tight seal between the insulated storage container 110 and the nipple 260. In some embodiments, the auxiliary storage container 120 has an opening 240 that is the same size or smaller than an opening of the insulated storage container 110.

In some embodiments, a gasket 230 (e.g., water-resistant neoprene O-ring) exists or can be positioned between the insulated storage container 110 and the funnel 124 or between the insulated storage container 110 and the auxiliary storage container 120. In these embodiments, the gasket 230 creates a liquid-tight seal between the funnel 124 and the insulated storage container 110. Likewise, a liquid-tight seal can be created between the insulated storage container 110 and the auxiliary storage container 120. In some embodiments, the auxiliary storage container 120 includes a funnel 124 that is attachable to the insulated storage container 110 and the auxiliary storage container 120. This attachable funnel 124 has a cone shaped interior that has a hole where the point of the convex would be. This allows the contents of the auxiliary storage container 120 to be poured into the insulated storage container 110 with minimal spilling. In some embodiments, the auxiliary storage container 120 is composed of stainless steel that creates a sleek shape, allowing the bottle to lift in and out of a cup holder without catching. The auxiliary storage container 120 can also include a hollow component therein used for storing substances such as powders and liquid and further includes an opening for introducing substances therein. The auxiliary storage container 120 is removably connectable to the bottom of the insulated storage container 110 via attaching the opening of the auxiliary storage container 120 to the interior of the bottom of the insulated storage container 110. In an assembled configuration, the auxiliary storage container 120 may be partially enclosed by the insulated storage container 110.

Figure 4:
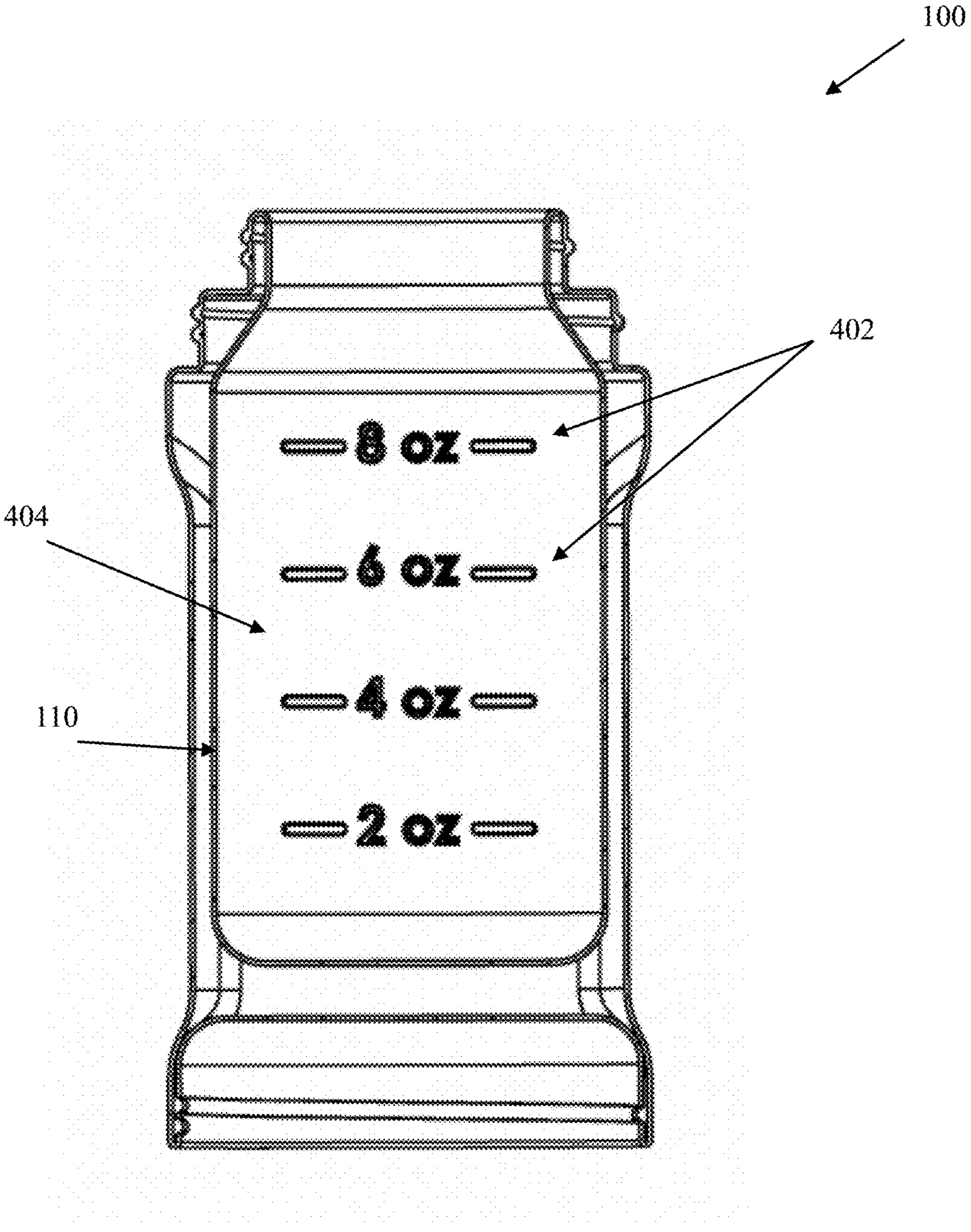
FIG. 4 is a front view of an all-in-one insulated baby bottle with volume measurement markings, according to some embodiments.

FIG. 4 is a front view of an all-in-one insulated baby bottle 100 with volume measurement markings 402, according to some embodiments. The volume measurement markings 402 may indicate fluid ounces or metric units of measurement, i.e., the International System of Units (SI units). In some embodiments, the volume measurement markings 402 are applied to a front side face 404 of the insulated storage container 110 and positioned at regular intervals.

As previously described, in some embodiments, the lid 130 is removably connected to the insulated storage container 110 via threads on the top of the insulated storage container 110 corresponding with threads on the interior of the bottom of lid 130. Similarly, the nipple fastener 220 may be placed over the nipple 260 and secured to the top of the insulated storage container 100 via threads on the interior of the nipple fastener. In this manner, the nipple is removably connected and secured to corresponding threads on the top exterior of the insulated storage container 110.

The interior of the bottom of insulated storage container 110 contains threads that correspond to threading surrounding the circumference of the top of funnel 124, such that the funnel 124 is removably connected and received into the bottom of insulated storage container 110. When connected in this manner, the outermost diameter of the funnel 124 and the outermost diameter of the insulated storage container 110 may be equal such that the surface of the two elements are level. In similar manner, the auxiliary storage container

120 is removably connected to the funnel via threading on the outer circumference of the top of auxiliary storage container 120 that corresponds with the threads on the interior of the bottom of funnel 124.

Removably connected elements such as the lid cover 210, lid 130, insulated storage container 110, funnel 124, and auxiliary storage container 120 can be configured such that when all are in an assembled configuration and removably connected in the manner described, the all-in-one baby bottle 100 forms a continuous cylinder, wherein the outer diameters of each of the elements form a smooth surface on the exterior of the all-in-one baby bottle 100.

A system for dispensing liquid to a baby is also described. The system includes a lid 130 with a hollow, partially-enclosed body, wherein the partially-enclosed body is formed by a first pair of walls that are vacuum-sealed, an insulated storage container 110 with a hollow, partially-enclosed body having a neck portion at a top of the partially-enclosed body, where the partially-enclosed body is formed from a second pair of walls that are vacuum-sealed. The lid 130 is removably connectable to the insulated storage container 110. The systems further includes an auxiliary storage container 120 having a hollow body that is removably connectable to the insulated storage container 110, and a nipple 260 composed of a flexible material that has a first opening configured to receive liquid from the insulated storage container 110 and a second opening configured to release liquid received from the insulated storage container 110. The nipple 260 is removably connectable to the neck portion of the insulated storage container 110 via the nipple fastener 220. The insulated storage container 110 and the lid 130 can be removably attached to create an air-tight space.

A method of operating an all-in-one baby bottle 100 is also disclosed. The method includes providing an all-in-one insulated baby bottle 100 as described above, with the insulated baby bottle 100 including an insulated storage container 110 having a first pair of vacuum-sealed walls, an lid 130 removably attached to the insulated storage container and having a second pair of vacuum-sealed walls, a nipple 260 configured to be removably connectable to the insulated storage container 110 via the nipple fastener 220 as described above. In some embodiments, the insulated baby bottle 100 further include an auxiliary storage container configured to be removably connectable to the insulated storage container. The method includes filling the insulated storage container 110 with a pre-heated liquid, such as water, breast-milk, milk, etc. and connecting the nipple 260 to the insulated storage container 110. Then, the lid 130 may be attached to the insulated storage container 110 to create an air-tight seal between these elements such that the liquid contained therein is prevented from leaking out. Then, the auxiliary storage container 120 may be filled with a substance, liquid or solid, for example a baby formula powder. The auxiliary storage container 120 may then be removably connected to the insulated storage container 110 via a set of mating threads on the auxiliary storage container and the insulated storage container.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

The terms "over," "under," "between," "disposed on," and "on" as used herein refer to a relative position of one material layer or component with respect to other layers or components. For example, one layer disposed on, over, or under another layer may be directly in contact with the other layer or may have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

Reference throughout this specification to "one embodiment," "an embodiment," or "some embodiments" means that a particular feature, structure, or characteristic described in connection with the embodiment is included in at least one embodiment. Thus, the appearances of the phrase "in one embodiment," "in an embodiment," or "in some embodiments" in various places throughout this specification are not necessarily all referring to the same embodiment. In addition, the term "or" is intended to mean an inclusive "or" rather than an exclusive "or." That is, unless specified otherwise, or clear from context, "X includes A or B" is intended to mean any of the natural inclusive permutations. That is, if X includes A, X includes B, or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Also, the terms "first," "second," "third," "fourth," etc. as used herein are meant as labels to distinguish among different elements and can not necessarily have an ordinal meaning according to their numerical designation. When the term "about," "substantially," or "approximately" is used herein, this is intended to mean that the nominal value presented is precise within ±10%.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

What is claimed is:

1. An insulated baby bottle comprising:

an insulated storage container comprising a first pair of walls that are vacuum sealed;

a nipple removably connectable to the insulated storage container with a liquid tight seal;

a lid, wherein the lid is removably attached to the insulated storage container;

an auxiliary storage container comprising a hollow component, wherein the auxiliary storage container is configured to removably connect to a bottom of the insulated storage container; and a cone-shaped funnel configured to removably connect the auxiliary storage container to the bottom of the insulated storage container, wherein the cone-shaped funnel comprises:

an inlet threaded to removably connect the cone-shaped funnel onto the auxiliary storage container; and an outlet threaded to removably connect the cone-shaped funnel to the bottom of the insulated storage container, and wherein the inlet is larger than the outlet.

2. The insulated baby bottle of claim 1 wherein the auxiliary storage container and the insulated storage container create an air-tight seal when connected.

3. The insulated baby bottle of claim 1, wherein the auxiliary storage container is partially enclosed when the insulated baby bottle is in an assembled configuration.

4. The insulated baby bottle of claim 1, further comprising a gasket positioned between the insulated storage container and the cone-shaped funnel.

5. The insulated baby bottle of claim 1, wherein the auxiliary storage container has an opening that is a same size or smaller than an opening of the insulated storage container.

6. The insulated baby bottle of claim 1, wherein a portion of a wall of the lid overlays an opening of the nipple creating an air-tight seal when the lid is attached to the insulated storage container.

7. The insulated baby bottle of claim 1, wherein the auxiliary storage container, the cone-shaped funnel, and the insulated storage container comprise outer diameters that are substantially equal to each other and wherein the insulated baby bottle forms a continuous cylinder when in an assembled configuration.

8. The insulated baby bottle of claim 1, wherein the insulated storage container has volume measurement markings positioned at regular intervals on a face of the insulated storage container.

9. The insulated baby bottle of claim 1, wherein the lid comprises a handle.

10. A system for dispensing liquid to a baby, the system comprising:

a lid comprising a hollow, partially-enclosed body, wherein the partially-enclosed body is formed by a first pair of walls that are vacuum-sealed;

an insulated storage container comprising a hollow, partially-enclosed body having a threaded portion at a top of the partially-enclosed body that corresponds with threads on a nipple fastener, wherein the partially-enclosed body is formed from a second pair of walls that are vacuum-sealed;

an auxiliary storage container comprising a hollow body that is removably connectable to a bottom of the insulated storage container;

a nipple configured to be clamped between the nipple fastener and the threaded portion at a top of the partially-enclosed body that corresponds with threads on the nipple fastener; and a cone-shaped funnel configured to removably connect the auxiliary storage container to the bottom of the insulated storage container, wherein the cone-shaped funnel comprises:

an inlet threaded to removably connect the cone-shaped funnel onto the auxiliary storage container, and an outlet threaded to removably connect the cone-shaped funnel to the bottom of the insulated storage container, and wherein the inlet is larger than the outlet.

11. The system of claim 10, wherein the auxiliary storage container, the cone-shaped funnel, and the insulated storage container comprise outer diameters that are substantially equal to each other and wherein the system forms a continuous cylinder when in an assembled configuration.

12. The system of claim 10, wherein the insulated storage container and the lid are removably attachable to create an air-tight space.

13. The system of claim 10, wherein the auxiliary storage container is partially enclosed when the system is in an assembled configuration.

14. The system of claim 13, further comprising a gasket positioned between the insulated storage container and the cone-shaped funnel.

15. The system of claim 10, further comprising a nipple fastener configured to attach the nipple to the insulated storage container.

16. The system of claim 10, wherein a portion of a wall of the lid overlays an opening of the nipple creating an air-tight seal when the lid is attached to the insulated storage container.

17. The system of claim 10, wherein the auxiliary storage container has an opening that is a same size or smaller than an opening of the insulated storage container.

18. The system of claim 10, wherein the insulated storage container has volume measurement markings positioned at regular intervals on a face of the insulated storage container.

19. A method of operating an insulated baby bottle comprising:

providing the insulated baby bottle comprising an insulated storage container having a first pair of vacuum-sealed walls, a nipple configured to be removably connectable to the insulated storage container, a lid removably attached to the insulated storage container, an auxiliary storage container configured to be removably connectable to a bottom of the insulated storage container, and a cone-shaped funnel configured to removably connect the auxiliary storage container to the bottom of the insulated storage container, wherein the cone-shaped funnel comprises an inlet threaded to removably connect the cone-shaped funnel onto the auxiliary storage container and an outlet threaded to removably connect the cone-shaped funnel to the bottom of the insulated storage container, and wherein the inlet is larger than the outlet;

filling the insulated storage container with a pre-heated liquid;

connecting the nipple to the insulated storage container;

attaching the lid to the insulated storage container to create an air-tight seal between the lid and the insulated storage container;

filling the auxiliary storage container with a substance; and connecting the auxiliary storage container to the insulated storage container.

20. The method of claim 19, wherein connecting the auxiliary storage container to the bottom of the insulated storage container comprises positioning a gasket between the cone-shaped funnel and the insulated storage container.

* * * * *